June 7, 1955 — J. L. RUPP — 2,710,220
STORAGE BATTERY HANDLING DEVICE
Original Filed Nov. 12, 1949
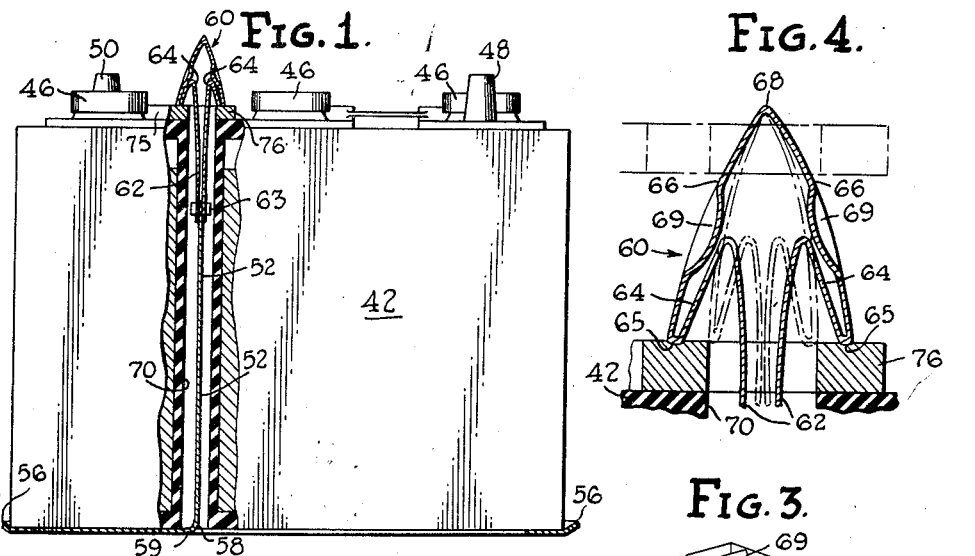
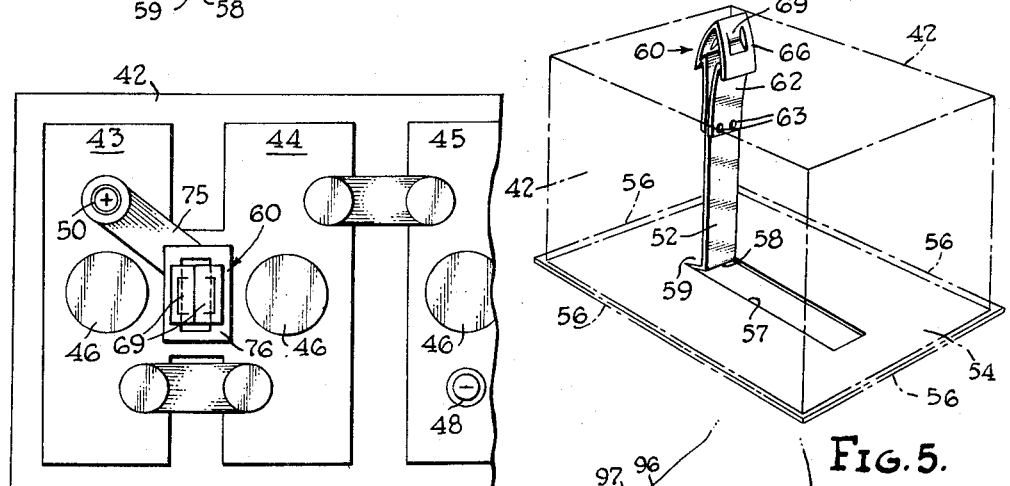
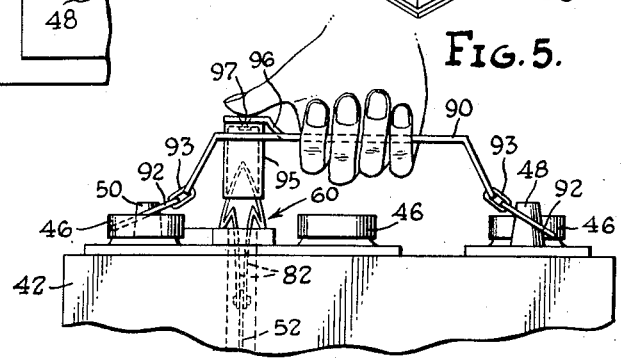
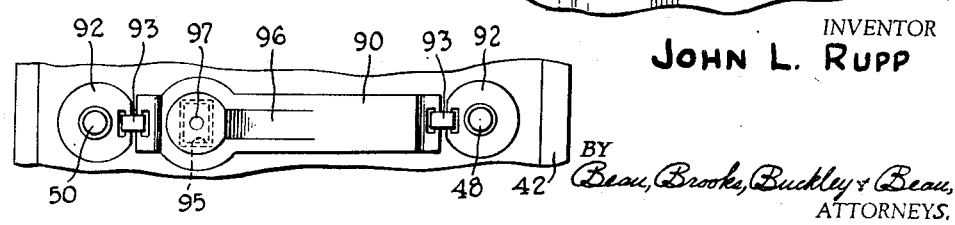
INVENTOR
JOHN L. RUPP
BY Beau, Brooks, Buckley & Beau,
ATTORNEYS.

United States Patent Office 2,710,220
Patented June 7, 1955

2,710,220

STORAGE BATTERY HANDLING DEVICE

John L. Rupp, Williamsville, N. Y., assignor to Gould-National Batteries, Inc., a corporation of Delaware Original application November 12, 1949, Serial No. 126,901, now Patent No. 2,653,988, dated September 29, 1953. Divided and this application September 16, 1953, Serial No. 385,331

2 Claims. (Cl. 294—92)

This invention relates to storage batteries, and more particularly to storage batteries of the automotive vehicle type and to means for detaching and lifting such batteries from their mounting in vehicles and the like. This application is a division of my copending application Serial No. 126,901, filed November 12, 1949, and now Letters Patent No. 2,653,988 dated September 29, 1953, which copending application is a continuation-in-part of my earlier application Serial No. 559,002, filed October 17, 1944, and now Letters Patent No. 2,487,831 dated November 15, 1949.

A primary object of this invention is to provide a servicing tool for detaching and lifting a storage battery from its mounting, which tool is relatively inexpensive and simple in construction while being highly practical and durable in operation.

Other objects and advantages of the invention will appear from the specification hereinafter.

In the drawing:

Fig. 1 is a view in side elevation of one form of battery with which the tool of this invention can be used, with portions broken away to show in section the battery mounting means thereof;

Fig. 2 is a fragmentary top plan view of the battery and mounting means of Fig. 1;

Fig. 3 is a perspective view of the battery mounting means of Figs. 1-2;

Fig. 4 is an enlarged fragmentary sectional view of a detail of Fig. 1, showing the battery holding device in operative and inoperative positions;

Fig. 5 is a fragmentary side elevation showing operation of a tool of the invention for unlocking and lifting the battery from its mounting; and Fig. 6 is a fragmentary top plan of the tool of Fig. 5.

Figs. 1-4 illustrate a form of battery and battery mount arrangement of a type disclosed and claimed in my earlier application Serial No. 126,901, wherein the battery is illustrated to be generally in the well known rectangular case form. As shown herein, the battery comprises a case 42 having therein three separate cells as shown by their corresponding cover plate elements 43—44—45. Thus, the drawing depicts a three-cell type storage battery such as is customarily used for starting and lighting service in present day automobiles and the like; but it will of course be understood that the invention may be applied with equal facility to storage battery devices of any number of cells. In the drawing each cell is illustrated to be provided with a filler cap 46 and an upstanding negative connection terminal post 48 is illustrated as extending above one of the end cells of the battery for detachable connection with the usual flexible cable as is customary in automotive battery practice. Similarly, the positive terminal device of the battery is illustrated to extend through the cover structure as indicated at 50 (Fig. 2) and may of course be formed thereat with an upstanding terminal post structure to receive the customary "ground" cable as is conventional in automotive battery practice. However, in accord with my invention a novel form of "ground" connection may be effected in conjunction with the battery hold-down mechanism, as will be explained hereinafter.

The battery hold-down arrangement of the invention is illustrated in Figs. 1-4 to comprise an upstanding rod or strap 52 which is either formed integrally with or firmly connected at its bottom end to the base plate structure 54 upon which the battery rests when in mounted position. Preferably, the base plate 54 will be provided in the form of a generally flat metal plate member having upturned rims 56 at the edges thereof for automatically centering the battery in position upon the base plate and retaining it thereon against sidewise displacement. As shown in Figs. 1 and 3, the strap member 52 may be formed integrally with the base plate 54 by cutting the base plate as indicated at 57 to provide the member in the form of a tongue connected at one end thereof to the base plate. Preferably the tongue member 52 will be upwardly bent as indicated at 58 (Fig. 1) at a position spaced from the anchored end portion of the tongue, whereby a generally horizontally disposed "spring" portion 59 interconnects the bottom plate structure 54 and the upright tongue portion 52. The parts are preferably formed of springy steel or the like, whereby it will be appreciated that the tongue member 52 is thereby adapted to be pulled upwardly against the spring action of the portion 59, for purposes to be explained hereinafter.

The strap member 52 is fitted at its upper end with a spring hook device which as shown in Figs. 1-4 may comprise a strip of spring metal which has been bent to provide oppositely paired leg portions 62—62 permanently fixed at their lower ends to the upper ends of the strap 52 as by means of rivets indicated 63. At their upper ends the leg portions 62—62 lead into reverse bent arm portions 64—64 (Fig. 4) which terminate in downwardly directed ridge portions 65—65 and then lead into upwardly bent pressure pad portions 66—66 which unite in integral connection at the apex portion 68 of the device. Preferably, the portions 66—66 are deformed as indicated at 69 to facilitate finger gripping thereof. Thus, it will be appreciated that the spring hook member may be readily formed from a single strip of spring metal by bending it into the sectional form thereof shown in Fig. 4 and then riveting the paired lower ends thereof to the tension strap 52 as indicated at 63.

As illustrated in Fig. 1, the cell partition wall structure of the battery case is vertically apertured as indicated at 70 so as to register with the tension strap and spring hook device whenever the battery is lowered into resting position upon the base plate 54; and the vertical aperture 70 and the spring hook device 60 are so constructed and arranged that the aperture 70 is of lesser width than the width between the bottom ledge portions 65—65 of the spring hook device when the latter is in its normal open position, as illustrated by the solid line showing thereof in Fig. 4. However, as shown in the figures, the spring hook device is so constructed and arranged that the resiliency of the various portions thereof operate normally to cause the hook device to assume the "open" condition thereof shown in the drawing, but upon application of squeezing pressures against the side pad portions 66—66 the hook device may be compressed against the elastic forces of the material thereof, such as to the broken line position thereof shown in Fig. 4 whereupon the hook device is contracted to such width dimension as to enable it to slip-fit through the aperture 70 in the battery case partition member.

Thus, it will be appreciated that the battery of the invention may be mounted upon the device shown in the drawing by simply first inserting the apex portion of the hook device 60 into the lower end of the aperture 70, and then lowering the battery into resting position upon the base plate 54. At this stage the upper end of the hook device 60 will protrude above the top cover of the battery and may thereupon be grasped between the fingers of the operator and pulled upwardly upon so as to draw the tension strap 52 upwardly against the spring force of the "spring" portion 59 at the bottom end of the strap, until the bottom ledge portions 65—65 of the spring hook device 60 clear the upper face of the cover structure of the battery in the region of the aperture 70. The spring forces within the hook device 60 will thereupon operate to cause the latter to expand as to the solid line condition thereof shown in Fig. 4 whereupon the bottom ledge portions 65—65 of the hook device will firmly engage upon the top cover structure of the battery so as to apply a constant pull-down force against the battery for maintaining it firmly in mounted position upon the base plate 54.

The mounting mechanism of the arrangement of Figs. 1–4 provides also for a novel and improved "ground" connection arrangement because a conductor strap 75 (Fig. 2) may be conveniently arranged to extend as from the terminal 50 over into the region of the battery case mounting aperture and to terminate thereat in an eye portion 76 formed to encircle the upper end of the aperture 70 through the battery case partition wall and to receive the bottom ledge portions 65—65 of the spring hook device (Fig. 4) in firmly gripped relation when the battery is mounted as explained hereinabove. Thus, an efficient "ground" connection is provided through the strap member 75 and the hook device 60 into the tension member 52 which is formed integrally with the bottom plate 54, whereby it will be appreciated that a convenient and otherwise improved method for "grounding" the mounted battery is provided in combination with improved physical support of the battery when in mounted condition.

Figs. 5 and 6 illustrate a method and means in accord with this invention for releasing the mounting hook device of Figs. 1–4 incidental to lifting of the battery from mounted positions; there being provided a battery carrying handle 90 formed of substantially rigid metal or the like and having linked to its opposite ends a pair of battery terminal post engaging rings 92, as by means of link devices 93. The rings 92—92 are centrally apertured so as to freely slip-fit down upon the battery terminal posts 48—50 whenever the rings are disposed in horizontal attitude, but whenever they are pulled upwardly at one edge thereto so as to become "cocked" relative to the terminal posts they will thereby grip the posts so as to prevent sliding therefrom, whereby the handle device may be employed to lift the battery out of mounted position.

As shown in Figs. 5 and 6, the handle member 90 is formed to include a suitable cam device which may be provided in the form of an open ended box 95 fixed to a spring finger portion 96 of the handle member 90, as indicated at 97. Thus, the finger portion 96 may be pressed upon as illustrated in Fig. 5 incidental to lifting upwardly against the handle portion 90 for battery lifting purposes, whereby the cam box 95 will be thereby thrust downwardly to enclose the spring hook device 60 and to cam the opposite sides thereof toward each other so as to release the hook device from engagement against the top surface of the battery case. Thus, by means of this simple tool as illustrated in Figs. 5 and 6, the operator may by use of only one hand simultaneously release the hook 60 and lift upwardly against the battery so as to remove it from mounted position.

The battery mounting arrangement and servicing tool of the invention greatly facilitates the job of mounting and changing batteries in automotive vehicles, aircraft and the like, and greatly reduces the time required to change batteries in installations where such time savings are important. The interiorly disposed battery hold-down device centers the holding down forces near the position of the center of gravity of the battery, and in this respect it will be appreciated that whereas the drawing at Figs. 1–3 and 5 illustrates provision of only one hold-down device inside one of the intermediate partitions of a three-cell battery, any desired number of hold-down devices of the invention may be employed in one or more of the partition portions of a battery. The preferred number and location of the hold-down devices will depend upon the plan view shape and dimensions of the battery to be mounted. In any case the relatively narrow aperture or apertures provided through the relatively rugged partition elements of the battery case enable the hold-down devices of the invention to provide firm support of the battery without danger of breakage of the battery case structure; and as explained hereinabove the novel battery hold-down and ground connection mechanism operates automatically to provide firm battery support and efficient "grounding" of the battery without special attention by the operator to the grounding connection.

It will of course be appreciated that although only one form of the invention has been shown and described in detail herein, it will be apparent to those skilled in the art that the invention is not so limited but that various changes may be made therein without departing from the spirit of the invention or the scope of the appended claims.

I claim:

1. A storage battery servicing tool for use in detaching and lifting a storage battery from a mounting platform having a hook device for engaging said battery in mounted position, said tool comprising a hand plate having a pair of battery terminal post engaging rings linked to the opposite ends thereof whereby said rings may be slip-fittted down upon said terminal posts and then cocked at an angle thereto whereupon upward pulling upon said handle will lift said battery, said handle plate having extending therefrom a spring finger device carrying a cam device adapted to be forced down upon and to cam said hook device into disengaged position, whereby the operator may simultaneously press down upon said spring finger device so as to disengage said cam device while at the same time pulling upwardly upon said handle so as to lift said battery from said platform.

2. A servicing tool for detaching and lifting a storage battery from a mounting therefor of the type having a strap extending through an opening in the battery structure and a spring hook device secured to the strap and engaging the top of the battery structure on opposite sides of the opening comprising, a handle member having a pair of battery terminal post engaging rings linked to the opposite ends thereof, said rings being adapted to slip-fit over the battery terminal posts when disposed in a plane substantially normal to the axis thereof and to become cocked and thus grip the terminal posts when pulled upwardly by said handle member, a spring finger portion carried by said handle member, and a cam device carried by said spring finger portion for being thrust downwardly thereby, said cam device being in the form of an open ended box adapted to enclose said spring hook device and cam the same out of engagement with the battery structure.

No references cited.